Jan. 3, 1967    R. VASSALLI    3,295,663
SUSPENSION ROD MAGAZINE

Filed Aug. 4, 1964    7 Sheets-Sheet 6

FIG. 7

INVENTOR
VASSALLI RENZO
BY
ATTORNEYS

United States Patent Office 3,295,663
Patented Jan. 3, 1967

3,295,663
SUSPENSION ROD MAGAZINE
Renzo Vassalli, Uzwil, Switzerland, assignor to Gebruder
Buhler, Uzwil, Switzerland, a company of Switzerland
Filed Aug. 4, 1964, Ser. No. 387,402
Claims priority, application Switzerland, Aug. 5, 1963,
9,668/63
16 Claims. (Cl. 198—85)

This invention relates to a mechanism for the automatic storage and transfer or rods, for example suspension rods for strands of long alimentary paste products, such as macaroni and the like from a preceding production stage to a following production stage.

The invention is particularly applicable where such production stages have different production rates. The invention provides in combination two continuous conveyer means co-operating with the preceding production stage and the succeeding production stage which includes transfer speed changing means for the transfer of the suspension rods from the preceding to the succeeding production stage.

A main object of this invention is to provide, between the two production stages, a "very elastic" and relatively high-capacity temporary storage conveyor mechanism of practically trouble-free and silent operation which moves both at its intake as well as its discharge end in proportional synchronism with the conveying mechanisms of the corresponding production stages.

The advantages of this invention will become particularly relevant in equipment for manufacturing and drying long strands alimentary paste goods, such as spaghetti, macaroni and the like, where no personnel will be required anymore for the supervision of the delivery of rods by the stripping and cutting unit and by the delivery of rods to the loading device. During the night shift, the rod magazine which has been filled up during normal daytime operation from the stripping unit, is connected to feed the stored rods to enable the delivery of rods continuously.

A standstill of the loading mechanism does not necessitate a corresponding shutdown of the stripping unit, since deliveries to and from the rod magazine respectively are independent from each other. This latter advantage is ensured by the fact that on account of the capacity defined by dryer and the storage means the number of suspension rods in the whole line never execeeds a desired maximum number. To this capacity the apparatus of this invention is easily adaptable.

A further development deals with a vertically adjustable traveling platform including pertaining control means.

A modification includes re-routing means for one continuous conveyer in respect of another continuous conveyer.

Another modification comprises two continuous conveyors arranged in parallel relationship to each other.

A still further development of this invention deals with the reciprocal operational functions of the two continuous conveyers in respect of the preceding and following production stages.

In continuation of the idea of this invention special engageable conveyer drives are described as associated means.

A still further development of the idea of this invention deals with temporary storage means disposed between the continuous conveyer means co-operating with one production stage and the continuous conveyer means co-operating with another production stage.

These and other characteristic features and advantages of this invention will become apparent from the following detailed description of five preferred embodiments and the appended drawing, showing in FIG. 1 a diagrammatic view of a preferred embodiment of this invention in a combination of a multistage dryer including storage means, FIG. 2 in an enlarged scale a detail of a transfer means represented in FIG. 1.

Figure 1:
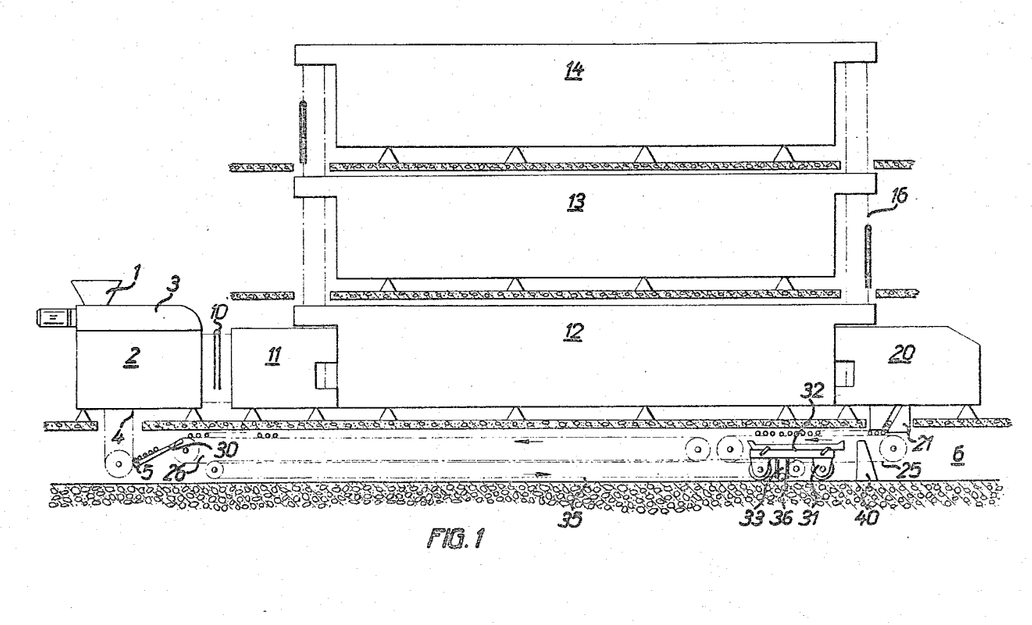

According to the diagrammatic general arrangement of the equipment for manufacturing strands of alimentary paste products, particularly so-called long goods, such as macaroni, spaghetti and the like, represented in FIGURE 1. The raw material is fed through a hopper 1 into a press 3 and then to a loading mechanism 2. Empty suspension rods are transferred upwardly to the loading mechanism 2 individually in succession by a chain elevator 4. The suspension rods 5 carrying strands 10 of alimentary paste goods then pass through a pre-dryer 11 and for complete drying, may be moved among a plurality of dryers 12, 13, 14 which may be disposed in various stories or levels and may be combined with suitable temporary storage means. Chains 16 bring the dried goods, still hanging on the suspension rods 5, to a stripping and cutting or trimming set 20, where they are separated from the rods 5. The empty rods 5 then pass to an intermediate magazine or chute 21, which delivers the rods onto a first, storage or feed conveyer 25 consisting of a pair of laterally spaced continuously operating parallel chains 25. Another separate second conveyer 26 extends from the conveyor 25 to within the feed zone of the loading mechanism 2. Conveyer 26 may be designed for continuous operation, and consists of two laterally spaced parallel chains having upper substantially horizontal reaches for carrying the rods 5 by supporting their ends. Between delivery conveyer 26 and the chains of elevator 4 passing into the loading mechanim 2 another intermediate storage means comprising a chute or slide 30 is disposed. Between the conveyor chains 25 and 26 a carriage 31 designed to move along conveyors 25 and 26 is arranged. A lifting frame 32 and a guide way 33 are main component parts of carriage 31. A chain 35 is disposed below delivery conveyer 26 and extends to within the range of feed conveyor 25. A roller 36 guided in guide-way 33 is connnected to chain 35 and confined in the guideway 33 for vertical movement. Near the intermediate storage magazine 21 which collects the rods 5 released by the stripping and trim-cutting set 20, a stop member 40 extending to within the frame 32 is fixed. As represented in detail in an enlarged scale in FIGURES 2 and 3 frame 32 is vertically movably arranged on and supported by hinged supports 42, 43. The chain 35 running over the two sprocket wheels 37 and 38 is actuated by a drive 39. Near the guide wheel 27 disposed at the discharge end of feed conveyer 25 a solid state control switch 45 is disposed. Another solid-state-actuated control switch 46 is fixed approximately at a distance corresponding to the length of the frame 32 from a guide wheel 28 disposed at the discharge end of the delivery conveyer 26. In the embodiment shown the conveyers 25 and 26 together with carriage 31 are arranged in a lower floor gallery 6.

The empty suspension rods 5 leaving the stripping and trim-cutting set 20 pass into intermediate storage magazine 21, from where they are moved individually in succession by the chains of feed conveyor 25 toward the conveyor 26. In a collapsed state the lifting frame 32 of carriage 31 is located below a plane defined by the supporting surface of the conveyer chains 25 and 26. The rods 5 are moved until the foremost rod contacts the control switch 45. The control switch 45 actuates driving motor 39 to drive the conveyer chains in the directions indicated by the arrows. Guided by guide roll 36 in the guide-way 33 the carriage 31 is moved towards the right end of its course to the stop member 40 which contacts frame 32 and lifts it by the tilting of the hinged supports 42 to cause the frame to move under the rods 5 and lift the rods 5 up off the chain conveyor 25. Frame 32 then remains for some time in the raised position shown in FIGURE 2 holding a stored supply of rods 5. Under the influence of roll 36 carriage 31 is then moved to the left. As soon as it reaches the last rod 5 which has been previously deposited on the delivery conveyor 26 the slanting front edge 34 of frame 32 is deflected by the rod 5 back into its original collapsed position of rest, thereby depositing the rods 5 onto delivery chain 26. As soon as a sufficient number of suspension rods 5 is delivered from the conveyor 25, which runs in synchronism with the stripping and trim-cutting set 20, to the conveyer 26, running in synchronism with the loading mechanism 2, to practically fill conveyer 26, the control switch 46 interrupts the energy supply of driving motor 39 to stop the movement of the frame 32 and the delivery of suspension rods 5 by conveyor 25 to conveyer 26. The switch 46 closes again as soon as the last rod 5 on conveyer 26 has moved away from and additional rods have been deposited on the conveyer 26, motor drive 39 is put in operation again.

This arrangement enables automatic and continuous retransfer of the rods leaving the stripping and trim-cutting set 20 to the loading mechanism 4. This arrangement further enables continuous operation for 24 hours daily of the loading mechanism and the drying plant as well as the operation of the storage means and the stripping and trim-cutting set, which permits a considerably higher production rate than the loading mechanism 4 and the dyers 11 to 14. A characteristic feature of the new arrangement consists in its silent operation and the absence of need for attendance.

Figure 4:
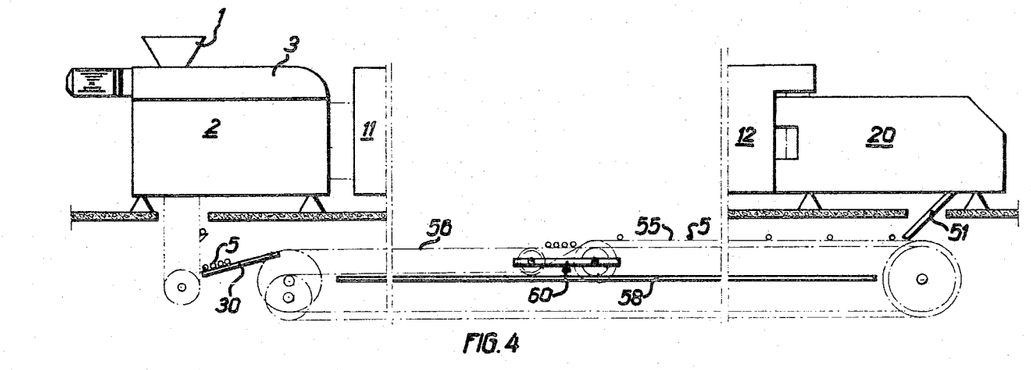
FIG. 4 a diagrammatic not-to-scale view of a second embodiment of the mechanism according to this invention, FIG. 5 a detail of FIGURE 4 in an enlarged scale, FIG. 6 a diagrammatic not-to-scale view of a third embodiment of the mechanism according to this invention, FIG. 7 a similar representation as in FIGURE 6 of a fourth embodiment, and FIG. 8 a similiar representation as in FIGURE 6 of a fifth embodiment of the mechanism according to this invention.
Figure 5:
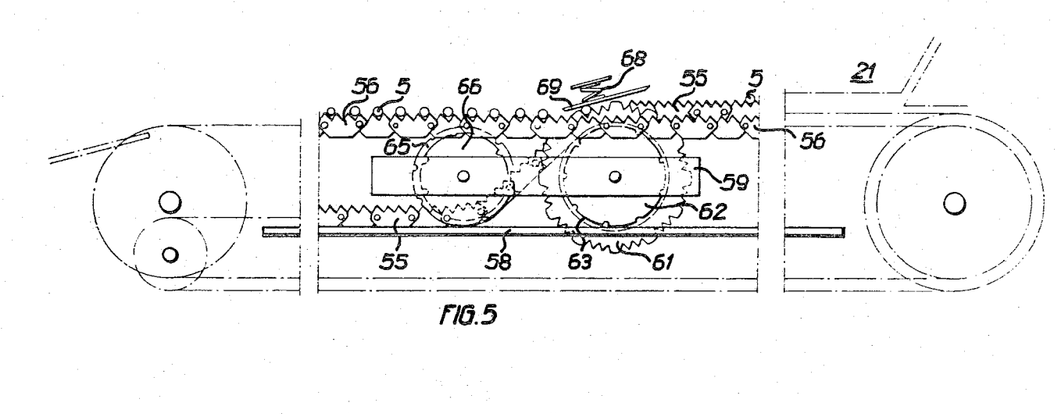

In an embodiment represented in FIGURES 4 and 5 the suspension rods 5 leaving the stripping and trim-cutting unit 20 pass over a chute 51 to a feed conveyor 55. A pair of laterally spaced delivery conveyer chains 56 are trained to run parallel to conveyer chains 55. Guiding means 60 including rotatable wheels 61 and 65 rotatably supported on a moveable frame 59 deflect the feed conveyer chains 55 from a plane above to another plane below delivery conveyer chains 56. The chain deflecting means 60 as well as the left hand upper reach of the feed conveyor chains 55 are supported by guide members 58 (FIG. 5). A transport wheel 61 extending to within the zone of feed conveyer chain 55 (FIGURE 5) is disposed in the same axis as displacement wheel 62 meshing with delivery conveyer chain 56. Transport wheel 61 is provided with a deflecting rim 63 for the feed conveyer chain 55. In the frame 59 of the chain deflecting unit 60 the wheel 65 and parallel to it a deviating or guide wheel 66 are rotably disposed. In the zone of the transport wheel 61, a springloaded press pad 68, 69 is disposed.

Figure 2:
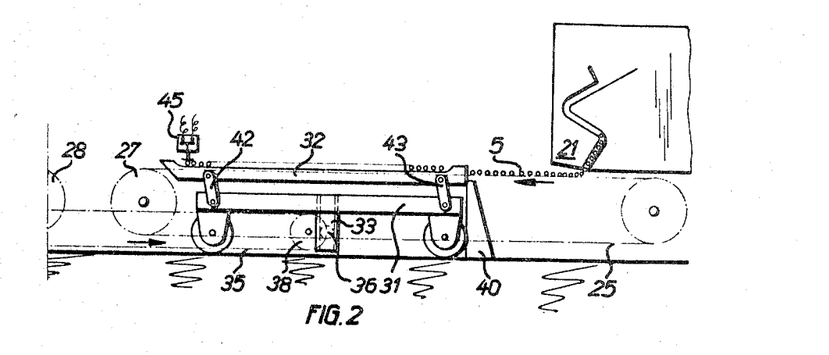
Figure 3:
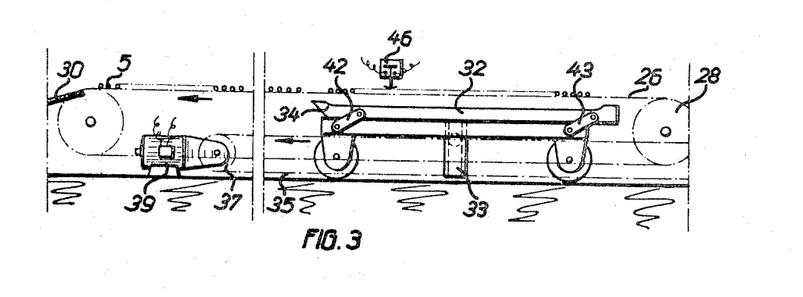
FIG. 3 a further detail of the transfer means of FIGURE 1 in the same scale as FIGURE 2.

Thus, the embodiment of the invention indicated in FIGS. 1 to 3 provides an apparatus for the automatic storage and transfer of articles, such as the suspension rod 5, between at least two production stages. In the embodiment illustrated, one of the production stages is a loading stage, at the location of the loading element 2, and the other production stage is the final processing stage 20 at which the rods are delivered out of the production system for return to the loading stage.

In all of the embodiments of the invention to be described herein, there are provided first and second conveyor systems, such as the chain conveyors 25 and 26 which are disposed between the two production stages which use and deliver the rod elements 5 at different rates. First means are associated with at least one of the conveyors in each embodiment for connecting this conveyor to the delivery means for receiving the articles from the production stage 20. In the embodiment of FIGS. 1 to 3 this comprises the chute 21 which permits the depositing of the rod directly on the conveyor 25. Second means are provided for selectively connecting each of the conveyors, for example the conveyors 25 and 26, to the loading means which, in the embodiment illustrated is the chain conveyor 4 for delivering the rods to the chain conveyor 4 as they are needed. In order to insure that there is always a supply of rods which may be delivered to the conveyor 4 and that there will also always be means for receiving the rods from the chute 21, there is provided means associated with each of the conveyors which in the embodiment illustrated is the movable truck with the frame 32, and which may be generally referred to as timing means, which permits the storage of the rods in the amounts received from the delivery means which are in excess of the amounts required for delivery to the loading means, and also permits the delivery of the rods after storage to the loading means.

In the embodiment of FIG. 1, the frame 32 will be moved under rods collected on the conveyor 25 to lift them off the conveyor to provide room for receiving additional rods. The frame 32, with the collected rods 5, will then be moved to the conveyor 26 and the rods will be deposited therefrom for timed delivery to the loading conveyor 4. The truck and the conveyors are timed so that there will always be a storage space for the rod with the normal rate of operation of the device 20 on one or the other of the conveyors 25 and 26 and there will also always be rods available for feeding to the loader 4.

The duty of the arrangement according to FIGURES 4 and 5 consists in transferring the suspension rods, released over relatively great intervals and in quick succession by the stripping and trim-cutting set 20, continuously and at very short intervals to a slowly moving delivery chain conveyor 56 cooperating and running in synchronism with the loading mechanism 2. The suspension rods 5 arriving by feed conveyor 55 at the chain deviating mechanism 60 are pressed simultaneously by means of press pads 69 into gaps arranged in the links of chain 55 and the circumference of transport wheel 61. As a result the transport wheel 61, having the same pitch as the chain 55 is forced to follow by a corresponding amount.

During this counter-clockwise rotation of transport wheel 61 the displacement wheel 62 tends to rotate simultaneously therewith, the simultaneous rotation of the wheel 62 with the wheel 61 is avoided by a suitable free-wheeling system (not shown) so that the counter-clockwise rotation of the displacement wheel 62 causes a corresponding displacement of the chain guiding mechanism 60 towards the right in the drawing. The suspension rods 5 are therefore successively deposited on the chain conveyor 56 in closely spaced relation as the chain 55 is moved downwardly through the plane of the top reach of the chain 56 and around guide wheel 66. While the feed conveyer 55 moves at a relatively high speed the delivery or discharge conveyer 56 moves considerably slower. During the intervals between individual depositions of suspension rods 5 onto conveyer chain 56, the chain guiding mechanism 60 has to move in synchronism with chain 56 in the direction towards the loading mechanism 2 in order to obtain a regular and closely spaced distribution of the rods 5 on the chain conveyer 56. This spacing is achieved by entrainer wheel 65. The guide wheel 66, disposed in substantially equiaxial relation in respect of wheel 65, serves the purpose of deviating the course of feed chains 55 into another plane below delivery conveyer chain 56. On this portion of its course chain 55 glides in the guideways 58.

During working interruptions of the stripping and trim-cutting set 20 the delivery of rods 5 to the chain guide mechanism 60 and to the delivery chain 56 continues and the top reach of the chain 56 continues to move toward intermediate storage container 30. If however, press 3 and loading mechanism 2 are stopped, the delivery chain conveyer 56 is stopped also and each further rod 5 reaching chain 56 moves the guide mechanism 60 towards the right in the view represented by the drawing.

The advantage of the arrangement consists in that no electric control and supervising means are required to insure a sufficient stock of empty suspension rods. The synchronism of the feed of the transfer chain 55 with the stripping and trim-cutting set 20 as well as with the chain conveyer 56 and with the loading mechanism is always maintained. A standstill of one of the two conveyers does not entail a corresponding standstill of the other because of the movable guiding means 60.

Figure 6:
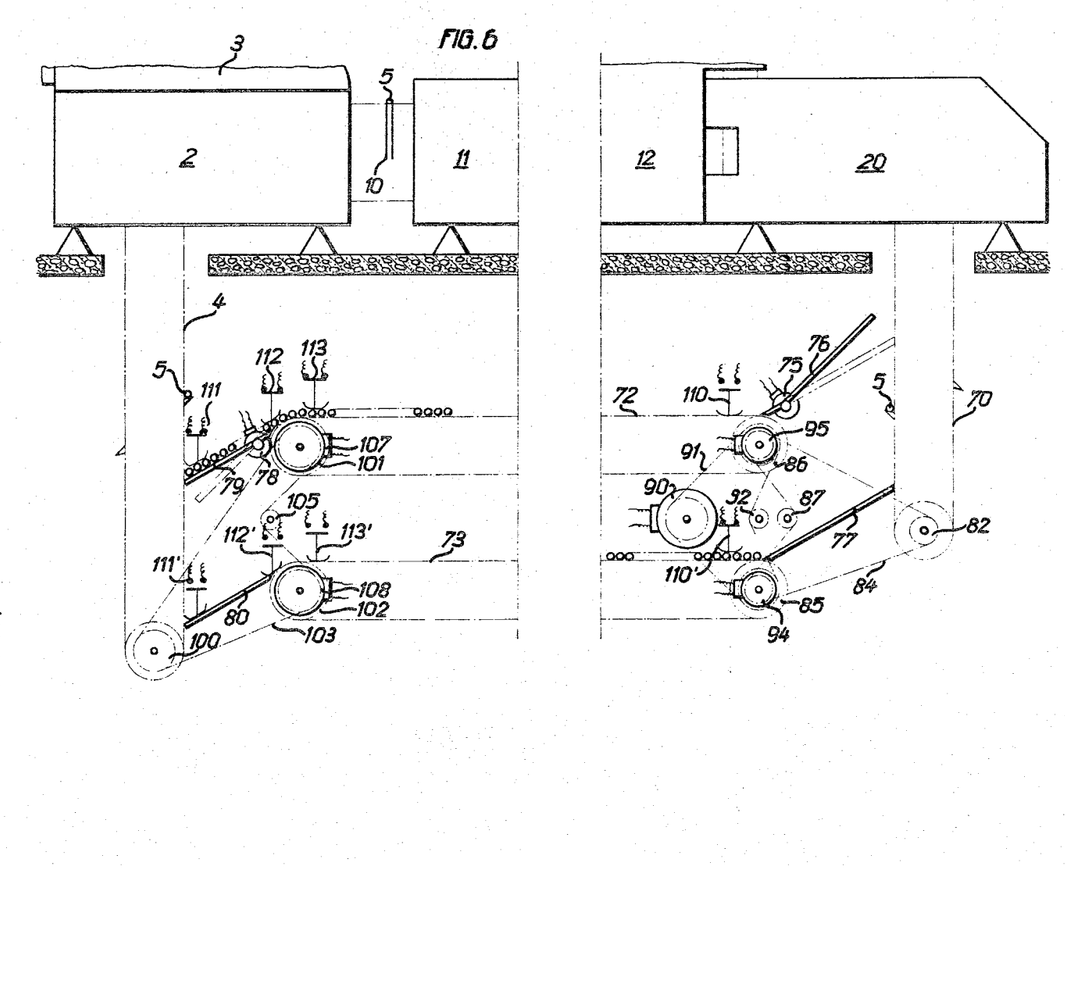

According to a further embodiment of this invention, a chain conveyer 70 brings the empty rods 5 released by the stripping and trim-cutting set 20 to chutes 76, 77 as shown in FIGURE 6. Between the two ends of the production line defined by the chain conveyer 70 of the cutting set 20 and the chain elevator 4 of the loading mechanism 2, two chain conveyers 72 and 73 are disposed parallel to one another and one above the other for independent and optional operation as feed conveyer or delivery conveyer respectively. Between the descending chain-side of conveyer 70 and the upper conveyer 72 a tiltable feed chute 76 operable by a servo-motor 75 is disposed, while a fixed chute 77 leads to the lower chain 73. A second tiltable chute 79 operable by a servo-motor 78 is located to cooperate with the chain 72 and chain elevator 4; and a second fixed chute 80 is located to cooperate with the chain 73 and chain conveyer 4. The driving sprocket wheel 82 on the lower axis of the chain conveyer 70 of the stripping and trim-cutting set 20 is actuated by a driving belt 84 passing also over corresponding pulleys on the axes of sprocket wheels 85 and 86 of chain conveyers 72 and 73 respectively. The belt drive 84 also includes belt tensioning means 87. Belt drive 84 in turn is actuated by means of a second belt drive 91 also passing over pulleys on the axes of conveyer sprocket wheels 85 and 86 as well a driving motor 90. Belt tensioning means 92 are provided for belt drive 91. The two drives are selectively operable by means of electromagnetic clutches 94 and 95. A proportionally synchronous drive for chain 4 includes a sprocket wheel 100, a chain 103, and a chain tensioning mechanism 105. Magnetic clutches 107 and 108 are provided for selective operation of this system from conveyer 72 or 73. In close proximity of the input end of conveyer 72 and 73 a full-state control switch 110 and 110' respectively is fixed. The discharge of each of the two conveyers 72 and 73 and the operations of the associated chutes 79 and 80 are controlled by switches 111, 112, 113 and 111', 112', 113'.

The arrangement based on the embodiment just described operates as follows:

In the stripping and cutting set 20 disposed at the end of production plant indicated diagrammatically in the drawing the processed alimentary paste goods 10 are stripped off the suspension rods 5, which are discharged by chain conveyer 70. The horizontal conveyers 72 and 73 may be used selectively as feed and delivery conveyer respectively. In arrangement shown in FIGURE 6, conveyer 72 operates as discharge or delivery conveyer in the sense of this description, while conveyer 73 operates as feed conveyer. The rods 5 discharged by chain conveyer 70 pass chute 77 to be deposited onto conveyer 73, which runs in proportional synchronism with chain conveyer 70, driven by belt drive 84. For this purpose, the clutch 94 is energized to cause engagement of the drive with sprocket wheel 85. Clutch 108 controlling sprocket wheel 102 is switched off. Clutch 95 of conveyer 72 is also disengaged. The rods 5 are now deposited side by side on conveyer 73. Clutch 107 being energized, conveyer 72 moves in proportional synchronism with chain elevator 4 of the loading mechanism 2. Servo-motor 78 having turned the chute 79 into operating position, the rods 5 are deposited one by one onto cams (not shown) on the chain elevator 4 provided for this purpose. As soon as so many rods 5 are discharged, switch 112 opens, which signifies that conveyer 72 is empty. The rods 5 having accumulated on conveyer 73 are brought to its discharge end guided by sprocket wheel 102. Switch 113 is now also open and driving motor 90 starts operation, clutch 94 brings drive 91 into engagement with sprocket wheel 85, causing conveyer 73 to bring the rods 5 having accumulated thereon, to its discharge end guided by sprocket wheel 102. As soon as the first and foremost rod 5 reaches switch 113' driving motor 90 is stopped again. When the driving motor 90 is switched on, clutch 95 is energized simultaneously so as to engage belt drive 84, causing conveyer 72 to move in proportional-synchronism with chain conveyer 70. As soon as the last suspension rod 5 has left the chute 79 and has been grasped by the chain elevator 4, switch 111 opens and the clutch 108 is energized to cause conveyer 73 to move in proportional synchronism with chain elevator chain 4 instead of the chain 70. The conveyer 73 thereby assumes the duty of a discharge or delivery conveyer in the sense of this description. By tilting chute 76 by means of the servo-motor 75 from the solid line position to the dotted line position the chute 76 will interrupt the rods 5 on the chain 70 and conveyer 72 will function as a feed conveyer and transport rods 5 from chain 70 toward chain 4. When conveyer 73 is operated as a feed conveyer and the chain elevator 4 and the loading mechanism 2 are at standstill the stripping and cutting set 20 will continue to operate so that the first and foremost empty suspension rod 5 might happen to reach switch 113' when the switch 110' is still closed. In this instance a shut-down of the stripping and cutting set 20 will take place.

The advantage of this arrangement consists in the absence of subassemblies having to be moved longitudinally in addition to the two basically independent horizontal chain conveyers designed for operation at three different speeds. Two of these rotation speeds are in proportional-synchronous relationship respectively with the stripping and cutting set 20 and the loading mechanism, while the third speed is generally higher than any of the two first-mentioned rotation speeds. Instead of the separate motor drive 90 other means, for example some speed transformation gear deriving its power from sprocket wheel 82 of chain conveyer 70 could be used to obtain the third rotation speed. In contrast to the arrangement represented in FIGURE 6 for the sake of better understanding in a very much extended view this embodiment enables a very compact design of the entire equipment.

Figure 7:
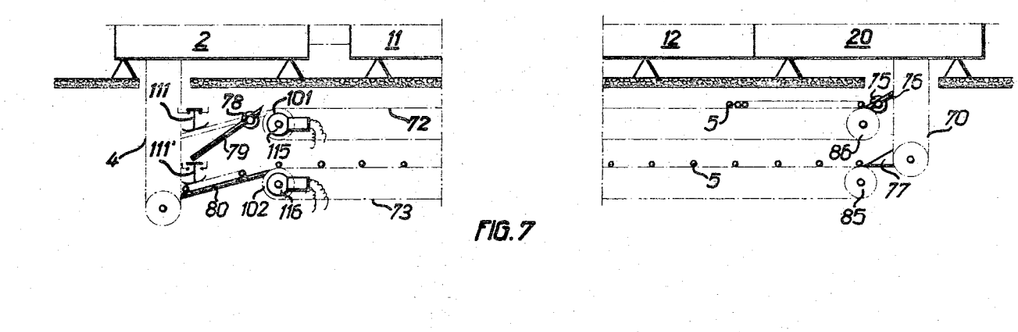

As a further development of this invention derived from the general arrangement according to FIGURE 6 a basically similar, but functionally slightly different modification is represented in FIGURE 7, wherein the horizontal conveyers 72 and 73 are provided with individual driving means 115 and 116. This driving means 115 and 116 may consist of variable speed electric motors, for example pole-changeable motors or single speed motors in combination with mechanical speed changing means.

As already described in connection with the arrangement according to FIGURE 6 the rods 5 are discharged in relatively quick succession by the discharge mechanism 70 of the stripping and cutting set 20. A tiltable chute 76 actuated by a servo-motor 75 intermittently connects conveyer 72 with the chain conveyer 70, while fixed chute 77 forms a fixed transfer passage between chain conveyer 70 and horizontal conveyer 73. The conveyer 73 operates as a discharge or storage conveyer in the sense of this description, whereas conveyer 72 operates as a feed conveyer. Conveyer 73, driven separately by an individual drive 116 disposed at its discharge end 102, rotates at a relatively high speed, resulting in the relatively wide spacing of the rods 5 moving towards chute 80 so that a relatively small number of rods 5 accumulate on the chute and most of them are immediately removed by the chain elevator 4 and passed onto the loading mechanism 2. The stripping and cutting set 20 however, operating at approximately three times the operating speed of the loading mechanism 2, two thirds of the empty rods 5 have to be discharged to a second conveyer, which in this instance is the feed conveyer 72. This selection is carried out by the tilting chute 76 actuated by servo-motor 75. During accumulation of the rods 5 on feed conveyer 72 it is driven by a separate drive motor 115, disposed at its discharge end which drives a sprocket wheel 101. The chute 79 is tilted by servo-motor 78 into such a position that interference with the rods 5 lifted into loading mechanism 2 is avoided.

As such arrangement are especially conceived to enable the stripping and cutting set to operate 8 hours daily, while the loading mechanism works 24 hours, the supply of empty suspension rods 5 to the chute 80 and to the chain elevator 4 ceases at the end of the 8 hours cycle of the stripping and cutting set 20. This discontinuation is supervised by the switch 111', which opens as soon as rod supply stops to actuate motor 115 to drive feed conveyer 72 at a considerably higher speed. Simultaneously chute 79 is tilted into an operative poistion to enable the rods to pass from conveyer 72 directly to chain elevator 4. The rods 5 stored on the conveyer 72 are then carried very rapidly to its discharge end. The first and foremost rod 5 reaching switch 111 effects switching of the motor drive 115 to a lower rotation speed corresponding to proportional synchronism with the chain elevator 4 ensuring thereby a continuously regular supply of empty suspension rods 5 to the loading mechanism 2.

If after a period of standstill the stripping and cutting set 20 starts operation again and if there still are empty rods 5 left at the discharge end of conveyer 72 passing below the actuation pad of switch 111, these rods 5 are delivered to the chain elevator 4 first, while the empty rods 5 leaving the stripping and cutting set 20 are moved over chute 77 to the conveyer 73, which hereby assumes the duty of a feed conveyer. As soon as the last rod 5 has left the chute 79 switch 111 acuates driving motor 116 which is switched to a higher speed, resulting in about one third of the rods 5 leaving the stripping and cutting set being supplied directly in regular and largely spaced succession to chain elevator 4 by the conveyer 73 and the conveyer 72 again assumes the duty of a discharge or storage conveyer in the sense of this invention.

From the above it can be seen that by appropriate combinatioin of relatively few control elements and pilot switches with this arrangement, relatively few changes of the operation speed and substantially two different rotation speeds of the conveyers 72 and 73 are sufficient.

Figure 8:
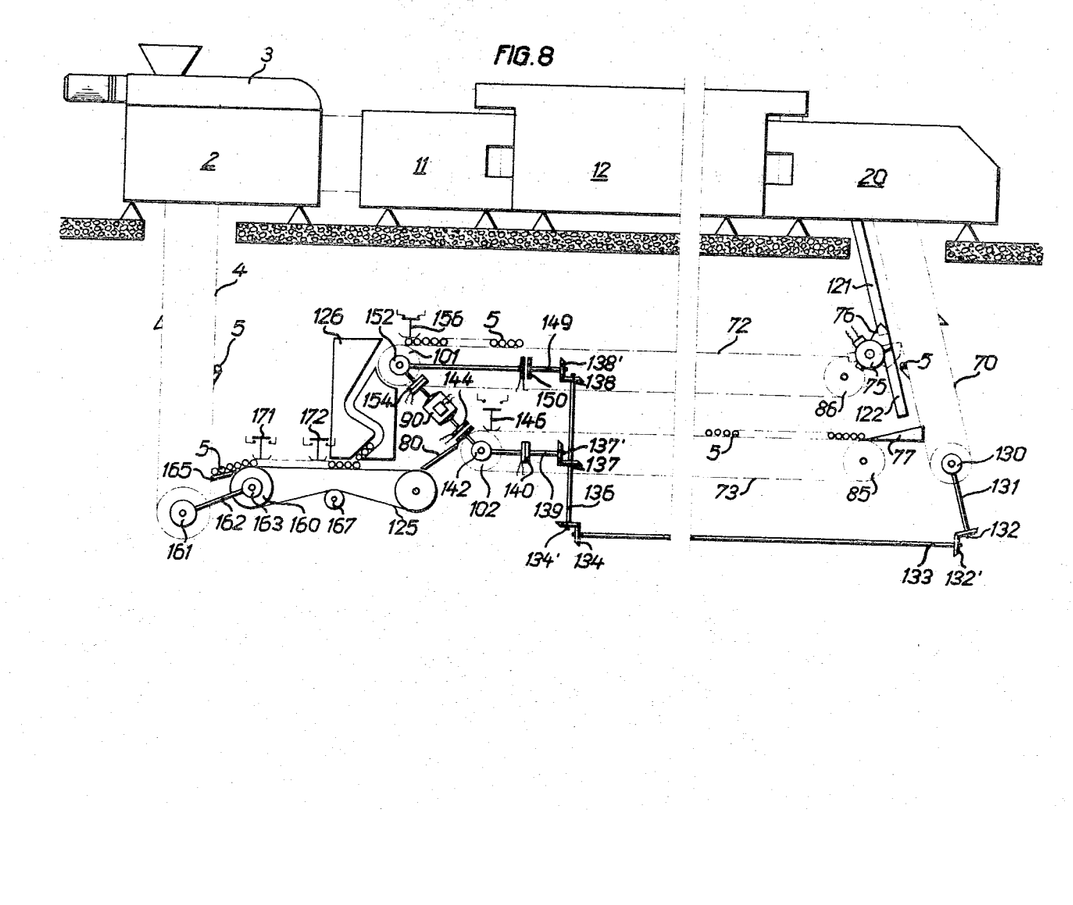

Another embodiment of the automatic storage and transfer mechanism, which also belongs to the scope of this invention is represented in FIGURE 8. This embodiment includes a booster-storage belt assuming the duty of a discharge or storage belt conveyer. Adjacent the stripping and cutting set 20 of the production plant is a chute 77 and a chute 76 along with a control servomotor 75 for guide rails 121, 122 which chutes are disposed along the chain-conveyer 70 and associated with the respective two horizontal chain conveyers 72 and 73. Between the discharge ends of conveyers 72 and 73 with their guide or sprocket wheels 101 and 102 and the chain elevator 4 of the loading mechanism 2 a fast rotating storage belt 125 is arranged. From the discharge end with the sprocket wheel 102 of the conveyer 73 a chute 80 leads to the storage belt 125. A further chute 126 connects the discharge end of conveyer 72 adjacent the sprocket wheel 101 with the storage belt 125.

At the lower end of chain conveyer 70 a gear-box 130 is disposed from which a rotatable shaft 131 drives through a bevel-gear drive 132, 132' and another shaft 133 and through a bevel-gear drive 134, 134' disposed at the discharge ends of conveyers 72 and 73 to drive the sprocket wheels 101 and 102. Bevel-gear wheel 134' is fixed on a shaft 136, which further carries bevel-gear wheels 137 and 138, meshing with corresponding bevel-gear wheels 137' and 138' respectively.

Bevel-gear wheel 137' is fixed on a shaft 139, carrying a coupling member 140 at its other end. Coupling member 140 enables switching of the driving shaft 136 to a driving gear 142.

The same gear 142 is also engageable with driving motor 90 by means of coupling means 144. At the discharge end of conveyer 73 a limit switch 146 is disposed.

A bevel-gear wheel 138' meshing with gear 138 is fixed on a shaft 149, which is engageable with driving gear 152 by means of a coupling 150. The same driving gear 152 may be actuated by driving motor 90 over a coupling 154. At the discharge end of conveyer 73 adjacent the sprocket wheel 101, a control switch 156 is disposed.

The driving reel 160 of the storage belt 125 is driven from the chain 4 by a gear 161 over shaft 162 and 163. Between driving reel 160 and chain 4 a chute 165 is disposed. An idler roll 167 keeps the storage belt 125 in a stretched condition. Two control switches 171 and 172 cooperate with storage belt 125.

The arrangement of the mechanism according to this embodiment works as follows:

The drive derived from gear-box 130 to the two shafts 139 and 149 between bevel-gear 137' and couplings 140' and 138' and 150 is in proportional synchronism with conveyer chains 70, which bring the empty rods 5 leaving the stripping and trim-cutting set 20 to the chutes 76 and 77. Chute 77 is stationary, whereas chute 76 may be engaged and disengaged with the chain conveyer 70. In the arrangement shown in FIGURE 8 conveyer 73 assumes the duty of a feed conveyer in the sense of this description, whereas the duty of the discharge or storage conveyer is assumed jointly by the conveyer 72 and the storage belt 125, the latter, in addition, also serving to provide boosting or additional storage means. Along conveyer chains 70 guide-rails 121 and 122 are arranged to guide the rods 5. Where the coupling 140 is engaged and the coupling 144 disengaged the conveyer 73 rotates in proportional synchronism with chain conveyer 70 in such a pre-determined speed-ratio that the empty rods 5 are deposited one by one on the conveyer 125. Coupling 150 is disengaged, so driving motor 90 drives the gear 152 over coupling 154 and therefore also the driving sprocket wheel 101 of the conveyer 72. Switches 171 and 172 intermittently energize and de-energize either the driving motor 90, or the coupling 154, which in this instance is an electro-magnetic clutch, motor 90 thereby running continuously. Excitation of the motor 90 or the coupling 154 takes place as soon as the last one of each batch of rods 5 has been passed on to the chute 165 and both switches 171 and 172 have closed. In this instant the discharge or delivery conveyer, now conveyer 72 starts rotating at a relatively high speed to feed further rods 5 along chute 126 onto storage belt 125 until so many rods 5 have accumulated thereon, that both switches 171 and 172 open again. The storage belt 125 is driven by the driving reel 160 and this in turn by the conveyer chain 4 over —the gear 161, shaft 162 and gear 163 disposed at the driving reel end of the storage belt conveyer 125. The drive is designed to impart a relatively very high rotation speed to the storage belt, for example a steel belt having a very smooth surface, so that the belt 125 will slide below the rods 5 when they are stacked at the chute 165 so that only the number of rods which as the chain elevator 4 is able to remove will be advanced.

As soon as conveyer 72 is empty, switch 156 and couplings 140 and 154 open, whereas couplings 150 and 144 are closing. At the same time servo-motor 75 tilts chute 76 into the track of chain conveyer 70. Conveyer 72 now assumes the duty of a feed-conveyor. During this time, driving motor 90 operates and the rods 5 stored on conveyer 73 are carried rapidly to its discharge end. As soon as the foremost rod 5 has reached control-switch 146, this drive stops and only starts again as soon as switches 171 and 172 close again on account of lack of rods on the storage belt 125. Conveyers 72 and 73 thus alternately assume the duties of a feed conveyer and a discharge or storage conveyer respectively in combination with the storage-belt conveyer 125. When conveyer 73 works as discharge or delivery conveyer, the rods 5 are passed on through chute 80 to the storage belt 125. The function of the switches 171 and 172 are thereby the same.

As can be seen from the above description, the arrangement according to FIGURE 8 a single proportional-synchronous drive only is sufficient, namely the one at the place of transfer from chain conveyer 70 to the conveyers 72 and 73. The transfer from conveyers 72 and 73 to the chain elevator 4 takes place over a high-speed conveyer means, for example the storage belt 125, so that the rods 5 are grasped individually by the lifting cogs of the chain elevator 4. In spite of the rapid rotation of the storage belt 125 in respect of the chain elevator 4, no locking of the rods 5 will take place on account of the smooth belt gliding freely through below the rods. Synchronism between conveyers 72 or 73 and storage belt 125 is not required, as the rods are released periodically in batches comprising only a limited number of them. This also enables the use of an entirely individual drive 90.

In all the examples dealt with in the foregoing description of various embodiments of this invention the characteristic elements concerned consist of electrically operated locking means controlling corresponding switching and driving means, such as motors, couplings and the likes. Suitable wiring arrangements for such purposes are supposed to be known and corresponding wiring diagrams have therefore been omitted. The essential control elements are indicated in the drawing. The most characteristic features of all the embodiments described consist in the ease of their adaptability to most different synchronisation conditions. The minimum of noise produced, the maximum of reliability in operation and the remarkable storage capacity obtained at minimum expense, enabling automation of a complete production line for so-called "long goods" of alimentary paste articles. Intermittent operation of the loading mechanism as well as of the stripping and trim-cutting set 20 does not entail any inconveniences in any of the embodiments described.

From the point of view of the structural concept, there are no definite special elemental components required for the chains, belts and other structural elements. Commercially available equipment and components can be used.

Control as well as driving means are not restricted to electrical and mechanical components, pneumatically and/or hydraulically operated control means and combinations thereof with electrical control equipment may be used with advantage. Instead of the mechanical synchonising means shown, their substitution by electromagnetic and/or electronic equipment is of course possible as well.

I claim:
1. An apparatus for the automatic storage and transfer of articles, for example suspension rods, for supporting strands of long alimentary paste goods such as macaroni, between at least two production stages having different production rates, comprising means for loading the articles into a first production stage adapted to be located adjacent the first production stage, means for delivering the articles after use from a second production stage adapted to be located adjacent the second production stage, first and second conveyers disposed between said loading means and said delivering means, first means associated with said first and second conveyers for connecting at least one of said conveyers to said delivering means for receiving the articles on the connected conveyer from said delivering means, second means for selectively connecting each of said conveyers to said loading means for delivering articles on the conveyer to said loading means, and timing means associated with each of said first and second conveyers and said first and second means for operating said first and second conveyers and said first and second means to store articles received from said delivering means in excess of those which are delivered to said loading means and for providing sufficient rods for delivery to said loading means during its operation.

2. An apparatus according to claim 1, wherein said timing means includes a wheeled frame member movable between said first and second conveyors, and control means for moving said wheeled frame member to remove articles stored on one of said conveyors and to transfer the articles to the other of said conveyors for feeding directly to said loading means.

3. An apparatus according to claim 1, wherein said first and second conveyers are disposed in horizontal alignment between said loading means and said delivering means, said second conveyor being located to receive articles from said delivering means, said first conveyor being arranged to advance articles placed thereon to said loading means, and wherein said timing means includes means for transferring articles stored on said second conveyor to said first conveyor for delivery to said loading means.

4. An apparatus according to claim 1, wherein said first and second conveyers are disposed substantially side-by-side between said loading means and said delivering means, said second conveyor being disposed to receive rods from said delivering means, said first conveyor being located to deliver rods to said loading means, said timing means including means for operating said first and second conveyors at different speeds, said second means for selectively connecting each of said conveyors to said loading means including transfer means between said first and second conveyor for transferring rods from said second conveyor to said first conveyor for delivery to said loading means.

5. An apparatus according to claim 4, wherein said transfer means includes a movable frame, first and second sprocket guide elements on said frame for training said second conveyor through a path extending from a plane above said first conveyor downwardly below the plane of the operation of said first conveyor for depositing rods from said second conveyor onto said first conveyor.

6. An apparatus according to claim 1, wherein said first and second conveyers each extends between said loading means and said delivering means.

7. An apparatus according to claim 1, wherein said first and second conveyers are arranged one above the other between said loading means and said delivering means, said first means for connecting at least one of said conveyors to said delivering means including a tiltable connecting chute between said first conveyor and said delivering means and a fixed delivery chute between said second conveyor and said delivering means.

8. An apparatus according to claim 7, wherein said second means for selectively connecting each of said first and second conveyor to said loading means includes a pivotal delivery chute connected between one of said first and second conveyors and said loading means.

9. An apparatus for the automatic storage and transfer of articles, for example suspension rods for supporting strands of long alimentary paste goods such as macaroni, between at least two production stages having different production rates of operation, comprising a substantially vertically disposed loading conveyor for loading articles into a first production stage adapted to be located adjacent the first production stage, a substantially vertically disposed delivery conveyor for delivering articles after use from a second production stage adapted to be located adjacent the second production stage, a first conveyor located between said loading conveyor and said delivering conveyor, a second conveyor located between said loading conveyor and said delivering conveyor, first delivering chute means located between said delivering conveyor and said first conveyor for selectively connecting said first conveyor to said delivering conveyor for receiving rods from said delivering conveyor, second delivery chute means for connecting said second conveyor to said delivering conveyor, first means connecting said first conveyor to said loading conveyor, second means connecting said second conveyor to said loading conveyor, and means for driving said first and second conveyors and said loading conveyor and said delivery conveyor for continuously receiving rods from said loading conveyor onto at least one of said first and second conveyors and for continuously delivering a supply of rods from one of said first and second conveyors to said loading conveyor.

10. An apparatus according to claim 9, including means for operating said first conveyor at a speed greater than said conveyor for receiving approximately two thirds of the articles from said delivery conveyor, and switch means associated with said second conveyor for connecting said first conveyor to said loading means when no rods are delivered by said second conveyor for delivery to said loading conveyor.

11. An apparatus for the automatic storage and transfer of articles such as suspension rods for supporting strands of long alimentary paste goods such as macaroni between at least two production stages having different production rates comprising a first set of spaced chain conveyors substantially vertically disposed and each having means thereon for engaging rods in succession as it is moved upwardly, a substantially vertically disposed discharge conveyor having means thereon for supporting rods for movement substantially vertically downwardly from a production stage, a first horizontal chain conveyor disposed between said loading conveyor and said discharge conveyor, a second horizontal chain conveyor located below said first conveyor and between said loading conveyor and said discharge, a first chute including a pivotal portion for selectively connecting said vertical discharge conveyor adjacent its upper portion with said first conveyor, a second chute connecting said second conveyor with said discharge conveyor below said first chute and receiving rods from said discharge conveyor, a first feeding chute connected between said first conveyor and said loading conveyor intermediate the height thereof for delivering rods from said first conveyor into engagement with said means on said loading conveyor for transporting into a production stage, means associated with said chute for displacing said chute out of association with said loading means when no rods are present for feeding to said loading conveyor, first and second means for selectively driving said first and second conveyors at selected speeds in timed relationship to said loading and said discharge conveyor, switch means adjacent the loading conveyor end of said second conveyor for speeding up said second conveyor when no rods are delivered on said second conveyor to said switch means, second switch means associated with said second chute means and connected to said first chute means for aligning the first chute means between said first conveyor and said loading conveyor but delivering rods from said first conveyor to said loading conveyor when no rods are present for delivery to said loading conveyor from said second conveyor.

12. An apparatus according to claim 11, including switch means adjacent the discharge conveyor end of said first conveyor for sensing rods on said first conveyor and for connecting said first delivery chute to said discharge conveyor when no rods are present on said first conveyor at said switch means.

13. An apparatus according to claim 11, including a switch adjacent the discharge conveyor end of said first conveyor in the path of said rods on said conveyor and displaceable by said rods for connecting said first delivery chute to said discharge conveyor when no rods are present on said first conveyor at said switch means.

14. An apparatus for the automatic storage and transfer of articles such as suspension rods for supporting strands of long alimentary paste goods such as macaroni between at least two production stages having different production rates comprising a first set of spaced chain conveyors substantially vertically disposed and having means thereon for engaging rods in succession as it is moved upwardly, a substantially vertically disposed discharge conveyor having means thereon for supporting rods for movement substantially vertically downwardly from a production stage, a first horizontal chain conveyor disposed between said loading conveyor and said discharge conveyor, a second horizontal chain conveyor located below said first conveyor and between said loading conveyor and said discharge conveyor, a belt conveyor extending outwardly from said loading conveyor to a location adjacent the ends of said first and second conveyors, a first chute including a pivotal portion for selectively connecting said vertical discharge conveyor adjacent its upper portion with said first conveyor, a second chute connecting said second conveyor with said discharge conveyor below said first chute and receiving rods from said discharge conveyor, means for selectively discharging rods from said first and second conveyors onto said belt conveyor, said belt conveyor being movable to move each rod into engagement with said means on said loading conveyor for transporting into a production stage, and first and second means for selectively driving said first and second conveyors at selected speeds in timed relationship to said loading and said discharge conveyor.

15. An apparatus according to claim 14, including switching means adjacent the discharge conveyor end of said belt for sensing rods on said belt and connected to said first and second conveyor driving means for adjusting the speeds of said conveyors to supply rods to said switch means.

16. An apparatus for the automatic storage and transfer of articles such as suspenion rods for supporting strands of long alimentary paste goods such as macaroni between at least two production stages having different production rates comprising a first set of spaced chain conveyors substantially disposed and having means thereon for engaging rods in succession as it is moved upwardly, a substantially vertically disposed discharge conveyor having means thereon for supporting rods for movement substantially vertically downwardly from a production stage, a first horizontal chain conveyor disposed between said loading conveyor and said discharge conveyor, a second horizontal chain conveyor located below said first conveyor and between said loading conveyor and said discharge conveyor, a first chute including a pivotal portion for selectively connecting said vertical discharge conveyor adjacent its upper portion with said first conveyor, a second chute continuously connecting said second conveyor with said discharge conveyor below said first chute and receiving rods from said discharge conveyor which are not picked up by said first conveyor, a first feeding chute connected between said first conveyor and said loading conveyor intermediate the height thereof for delivering rods from said first conveyor into engagement with said means on said loading conveyor for transporting into a production stage, means associated with said chute for displacing said chute out of association with said loading means when no rods are present for feeding to said loading conveyor, first and second means for selectively driving said first and second conveyors at selected speeds in timed relationship to said loading and said discharge conveyor, and switch means adjacent the loading conveyor end of said second conveyor for speeding up said second conveyor when no rods are delivered on said second conveyor to said switch means.

References Cited by the Examiner
UNITED STATES PATENTS

| | | | |
|---|---|---|---|
| 1,921,577 | 8/1933 | Nelson | 198—85 |
| 2,700,448 | 1/1955 | Ames | 198—21 |

EVON C. BLUNK, *Primary Examiner.*

EDWARD A. SROKA, *Examiner.*